(12) United States Patent
Liao et al.

(10) Patent No.: US 12,491,386 B2
(45) Date of Patent: Dec. 9, 2025

(54) ANTI-VARICELLA-ZOSTER VIRUS ANTIBODY

(71) Applicant: Zhuhai Trinomab Pharmaceutical Co., Ltd., Zhuhai (CN)

(72) Inventors: Huaxin Liao, Guangdong (CN);
Yueming Wang, Guangdong (CN);
Weihong Zheng, Guangdong (CN);
Jiaqi Li, Guangdong (CN)

(73) Assignee: Zhuhai Trinomab Pharmaceutical Co., Ltd., Beijing (CN)

( * ) Notice: Subject to any disclaimer, the term of this patent is extended or adjusted under 35 U.S.C. 154(b) by 860 days.

(21) Appl. No.: 17/775,727

(22) PCT Filed: Nov. 3, 2020

(86) PCT No.: PCT/CN2020/126159
§ 371 (c)(1),
(2) Date: May 10, 2022

(87) PCT Pub. No.: WO2021/093639
PCT Pub. Date: May 20, 2021

(65) Prior Publication Data
US 2023/0192817 A1 Jun. 22, 2023

(30) Foreign Application Priority Data
Nov. 11, 2019 (CN) .......................... 201911095151.9

(51) Int. Cl.
*A61K 39/395* (2006.01)
*A61P 31/22* (2006.01)
*C07H 21/04* (2006.01)
*C07K 16/00* (2006.01)
*C07K 16/08* (2006.01)
*C07K 16/46* (2006.01)
*C12N 5/02* (2006.01)
*C12N 15/00* (2006.01)
*A61K 39/00* (2006.01)

(52) U.S. Cl.
CPC ............ *C07K 16/088* (2013.01); *A61P 31/22* (2018.01); *A61K 2039/505* (2013.01); *C07K 2317/21* (2013.01)

(58) Field of Classification Search
None
See application file for complete search history.

(56) References Cited

FOREIGN PATENT DOCUMENTS

| | | |
|---|---|---|
| CN | 101663318 A | 3/2010 |
| CN | 107760690 A | 3/2018 |
| WO | 9531546 A1 | 11/1995 |

OTHER PUBLICATIONS

Birlea et al.: "Human Anti-Varicella-Zoster Virus (VZV) Recombinant Monoclonal Antibody Produced after Zostavax Immunization Recognizes the gH/gL Complex and Neutralizes VZV Infection " Journal of Virology, vol. 87, No. 1, Jan. 1, 2013 (Jan. 1, 2013), pp. 415-421, XP055965726.

Cai et al., Preparation of monoclonal antibodies against major capsid protein ORF40 of Varicella-Zoster Virus, Chinese Journal of Immunology, vol. 35, No. 9, May 12, 2019.

Cangene, "Highlights of Prescribing Information," from https://varizig.com/VARIZIG_PI.pdf, initial approval 2012.

EP Search Report issued in the EP Application No. 20887206.9, mailed Dec. 15, 2023.

Fu et al.,"Preparation of monoclonal antibodies against glycoprotein N of Varicella-Zoster Virus and a Preliminary study," Chinese journal of virology, vol. 33, No. 3, May 27, 2017.

Marin et al., "Updated Recommendations for Use of VariZIG—United States, 2013," MMWR, Jul. 19, 2013, vol. 62, pp. 574-576,.

Sullivan, N.L., et al., Journal of Virology, 2018, vol. 92, No. 14, e00269(pp. 1-18), DOI: 10.1128/JVI.00269-18.

Suzuki et al.: "Isolation of therapeutic human monoclonal antibodies for varicella-zoster virus and the effect of light chains on the neutralizing activity", Journal of Medical Virology, John Wiley & Sons, Inc, US, vol. 79, No. 6, Jun. 1, 2007 (Jun. 1, 2007), pp. 852-862, XP002485636, ISSN: 0146-6615, DOI: 10.1002/JMV. 20838 p. 853, col. 2.

Written Opinion of the International Searching Authority issued in the International Application No. PCT/CN2020/126159, mailed on Feb. 5, 2021, English translation of the ISR attached.

*Primary Examiner* — Maher M Haddad
(74) *Attorney, Agent, or Firm* — Potomac Law Group, PLLC; Judith U. Kim

(57) ABSTRACT

The present invention relates to neutralizing monoclonal antibodies or antigen-binding fragments thereof that are specific for and bind with high affinity to Varicella-Zoster Virus, and a preparation method for producing such antibodies. The antibodies of the present invention have high efficiency in neutralizing Varicella-Zoster Virus infection. The present invention also relates to the epitope to which the antibodies bind and the use of the antibodies in the diagnosis, prevention and treatment of infected individuals.

19 Claims, 4 Drawing Sheets
Specification includes a Sequence Listing.

ANTI-VARICELLA-ZOSTER VIRUS ANTIBODY

REFERENCE TO SEQUENCE LISTING SUBMITTED ELECTRONICALLY

This application contains a sequence listing which has been electronically submitted in ASCII text file (Name: 4384-0001US01_ST25.txt; Size: 11.9 KB; and Date of Creation: Oct. 28, 2022).

BACKGROUND OF THE INVENTION

Varicella-zoster virus (VZV), an enveloped virus, belongs to the human herpes simplex virus. VZV is highly species-specific, and its natural infection only occurs in humans and gorillas. There are a variety of glycoproteins, such as gE, gB, gH, gI, gC, and gL, on the envelope of VZV. VZV glycoproteins are not only involved in the entry of viruses into cells, but also can be transfered from infected cells to uninfected cells, which can initiate humoral and cellular immune responses to the virus.

VZV enters the body through the conjunctiva and respiratory mucosa upon the first infection and causes chickenpox, that is, the primary infection with varicella, which is a highly contagious common disease in children. For healthy children, chickenpox is a self-limiting disease with a duration of about 4 to 5 days. For children with immunodeficiency and for non-immune neonates, however, chickenpox infection may cause serious complications, such as viral pneumonia, encephalitis, etc., and can even lead to fatal consequences. A small number of adults will be infected with chickenpox, show severe symptoms, often complicated by pneumonia (20%-30%) and a high mortality rate. For pregnant women, in addition to the serious condition, chickenpox can also cause fetal malformations, miscarriage or stillbirth. Studies have shown that the incidence of varicella during pregnancy is from 0.1‰ to 0.7‰. If the first infection occurs in the first 6 months of pregnancy, the intrauterine infection rate is about 25%; the incidence of congenital varicella syndrome is about 12% of the infected fetus.

VZV can also latently reside in the ganglion. Factors such as aging, weakened immunity or immunosuppression due to disease or drugs will cause the latent virus to be reactivated, causing herpes zoster distributed along the nerve, that is, recurrent herpes zoster infection (zoster). Recurrent infection of VZV can cause abnormal disseminated infection of the skin lesions and damage to the organs, such as lung, brain, liver, kidney, heart and eyes. It is often accompanied by postherpetic neuralgia, and even death in severe cases. The pain of postherpetic neuralgia is severe and can last for several years, which greatly affects the patient's quality of life. The incidence of herpes zoster and postherpetic neuralgia increases with age, which causes a greater social burden on an aging society.

At present, the most important preventive measure for VZV virus infection is vaccination. For the two clinical symptoms caused by VZV virus primary infection and recurrent infection, varicella vaccine and herpes zoster vaccine are currently available for prevention. Other treatment methods are mainly based on antiviral agents, including use of acyclovir, famciclovir, valacyclovir, acyclovir, vidarabine, and the like. Therefore, there is currently no effective and specific treatment.

Currently, antibody therapy based on virus-neutralizing antibodies has been applied to the treatment of many diseases. For VZV virus infection, the U.S. FDA has approved a Varicella-Zoster Immunoglobulin (VZIG), produced by Cangene, Canada, for use in high-risk populations of VZV infection, mainly pregnant women and newborns. However, the VZV immunoglobulin is a blood product with its own resource scarcity and inter-batch variability, and there is a window period and the risk of spreading pathogens. In addition, this type of product involves the safety issue, such as spreading blood-borne pathogens, e.g., HIV, hepatitis B virus, hepatitis C virus, etc., so there are defects in application. Currently, no VZV immunoglobulin-related agent is commercially available in China and most countries.

So far, the existing vaccines and systemic antiviral agents can prevent and control VZV infection, however, they cannot eliminate the variety of complications of VZV infection. Therefore, there is still a need to find effective neutralizing antibodies against VZV, which can effectively detect VZV and block VZV from infecting hosts and spreading between hosts. In addition, there is still a need for an improved method for the treatment of VZV infection, especially a method suitable for emergency intervention against VZV infection. The anti-VZV antibodies and compositions thereof provided in this application meet the above-mentioned needs.

SUMMARY OF THE INVENTION

The present invention provides a new neutralizing anti-VZV antibody capable of binding to VZV with high affinity, a composition comprising the antibody, a kit, use of the anti-VZV antibody, and a method of use and preparation of the same.

In one aspect, the present invention provides an isolated anti-VZV antibody and antigen fragment thereof. In a specific embodiment, the anti-VZV antibody and antigen fragment thereof comprise one, two or three CDRs (preferably three CDRs) selected from the VH region sequence of any antibody shown in Table I. In other embodiments, the antibody of the present invention comprises one, two or three CDRs (preferably three CDRs) selected from the VL region sequence of any antibody shown in Table I. In some embodiments, the antibody of the present invention comprises the 6 CDR region sequences of any antibody shown in Table I. In a preferred embodiment, the CDR sequences of the antibody are those shown in Table II.

In some embodiments, the anti-VZV antibody or antigen-binding fragment thereof of the present invention comprises A) heavy chain complementarity determining regions (CDRs): (i) CDR1, which comprises an amino acid sequence selected from SEQ ID NO: 1, 7 and 13, or a sequence comprising one or more and no more than 5 amino acid substitutions (such as conservative substitutions), deletions, or insertions relative to SEQ ID NO: 1, 7 or 13, (ii) CDR2, which comprises an amino acid sequence selected from SEQ ID NO: 2, 8 and 14, or a sequence comprising one or more and no more than 5 amino acid substitutions (such as conservative substitutions), deletions, or insertions relative to SEQ ID NO: 2, 8 or 14, (iii) CDR3, which comprises an amino acid sequence selected from SEQ ID NO: 3, 9 and 15, or a sequence comprising one or more and no more than 5 amino acid substitutions (such as conservative substitutions), deletions, or insertions relative to SEQ ID NO: 3, 9 or 15, and B) light chain complementarity determining regions (CDRs): (i) CDR1, which comprises an amino acid sequence selected from SEQ ID NO: 4,10 and 16, or a sequence comprising one or more and no more than 5 amino acid substitutions (such as conservative substitutions), deletions, or insertions relative to SEQ ID NO: 4, 10 or 16, (ii)

CDR2, which comprises an amino acid sequence selected from SEQ ID NO: 5, 11 and 17, or a sequence comprising one or more and no more than 5 amino acid substitutions (such as conservative substitutions), deletions, or insertions relative to SEQ ID NO: 5, 11 or 17, (iii) CDR3, which comprises an amino acid sequence selected from SEQ ID NO: 6, 12 and 18, or a sequence comprising one or more and no more than 5 amino acid substitutions (such as conservative substitutions), deletions, or insertions relative to SEQ ID NO: 6, 12 or 18, wherein the anti-VZV antibody comprising the modified CDRs still has the ability to bind to VZV.

In some embodiments, the anti-VZV antibody or antigen-binding fragment thereof of the present invention comprises A) heavy chain complementarity determining regions (CDRs): (i) CDR1 consisting of the amino acid sequence of SEQ ID NO: 1, (ii) CDR2 consisting of the amino acid sequence of SEQ ID NO: 2, (iii) CDR3 consisting of the amino acid sequence of SEQ ID NO: 3, and B) light chain complementarity determining regions (CDRs): (i) CDR1 consisting of the amino acid sequence of SEQ ID NO: 4, (ii) CDR2 consisting of the amino acid sequence of SEQ ID NO: 5, (iii) CDR3 consisting of the amino acid sequence of SEQ ID NO: 6.

In some embodiments, the anti-VZV antibody or antigen-binding fragment thereof of the present invention comprises A) heavy chain complementarity determining regions (CDRs): (i) CDR1 consisting of the amino acid sequence of SEQ ID NO: 7, (ii) CDR2 consisting of the amino acid sequence of SEQ ID NO: 8, (iii) CDR3 consisting of the amino acid sequence of SEQ ID NO: 9, and B) light chain complementarity determining regions (CDRs): (i) CDR1 consisting of the amino acid sequence of SEQ ID NO: 10, (ii) CDR2 consisting of the amino acid sequence of SEQ ID NO: 11, (iii) CDR3 consisting of the amino acid sequence of SEQ ID NO: 12.

In some embodiments, the anti-VZV antibody or antigen-binding fragment thereof of the present invention comprises A) heavy chain complementarity determining regions (CDRs): (i) CDR1 consisting of the amino acid sequence of SEQ ID NO: 13, (ii) CDR2 consisting of the amino acid sequence of SEQ ID NO: 14, (iii) CDR3 consisting of the amino acid sequence of SEQ ID NO: 15, and B) light chain complementarity determining regions (CDRs): (i) CDR1 consisting of the amino acid sequence of SEQ ID NO: 16, (ii) CDR2 consisting of the amino acid sequence of SEQ ID NO: 17, (iii) CDR3 consisting of the amino acid sequence of SEQ ID NO: 18.

In some embodiments, the anti-VZV antibody or antigen-binding fragment thereof of the present invention comprises a heavy chain variable region VH, which comprises or consists of an amino acid sequence having at least 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99% identity or higher identity to the amino acid sequence selected from SEQ ID Nos: 19, 21, 23 or 25, and the anti-VZV antibody comprising the VH has the ability to bind to VZV. In some embodiments, the anti-VZV antibody or antigen-binding fragment thereof of the present invention comprises a heavy chain variable region VH, which comprises 6 CDRs of any antibody shown in Table II, and has at least 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99% identity to the amino acid sequence selected from SEQ ID Nos: 19, 21, 23 or 25, and the anti-VZV antibody comprising the VH has the ability to bind to VZV. In some embodiments, the heavy chain variable region VH of the anti-VZV antibody comprises an amino acid sequence having one or more substitutions (such as conservative substitutions), insertions or deletions relative to the amino acid sequence selected from SEQ ID NOs:19, 21, 23 or 25, and the anti-VZV antibody comprising the VH has the ability to bind to VZV.

In some embodiments, the anti-VZV antibody or antigen-binding fragment thereof of the present invention comprises a light chain variable region VL, which comprises or consisting of an amino acid sequence having at least 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99% identity or higher identity to the amino acid sequence selected from SEQ ID Nos: 20, 22, 24 or 26, and the anti-VZV antibody comprising the VL has the ability to bind to VZV. In some embodiments, the anti-VZV antibody or antigen-binding fragment thereof of the present invention comprises a light chain variable region VL, which comprises 6 CDRs of any antibody shown in Table II, and has at least 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99% identity to the amino acid sequence selected from SEQ ID Nos: 20, 22, 24 or 26, and the anti-VZV antibody comprising the VL has the ability to bind to VZV. In some embodiments, the light chain variable region VL of the anti-VZV antibody comprises an amino acid sequence having one or more substitutions (such as conservative substitutions), insertions or deletions relative to the amino acid sequence selected from SEQ ID NOs:20, 22, 24 or 26, and the anti-VZV antibody comprising the VL has the ability to bind to VZV.

In some embodiments, the anti-VZV antibody or antigen-binding fragment thereof of the present invention comprises a heavy chain variable region (VH) and a light chain variable region (VL), wherein:

1) the heavy chain variable region VH comprises or consists of an amino acid sequence having at least 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99% identity or higher identity to the amino acid sequence selected from SEQ ID Nos: 19, 21, 23 or 25; and the light chain variable region VL comprises or consists of an amino acid sequence having at least 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99% identity or higher identity to the amino acid sequence selected from SEQ ID Nos: 20, 22, 24 or 26, or 2) the heavy chain variable region VH comprises 6 CDRs of any antibody shown in Table II, and has at least 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99% identity to the amino acid sequence selected from SEQ ID Nos: 19, 21, 23 or 25; and the light chain variable region VL comprises 6 CDRs of any antibody shown in Table II, and has at least 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99% identity to the amino acid sequence selected from SEQ ID Nos: 20, 22, 24 or 26, and the anti-VZV antibody comprising the VH and VL has the ability to bind to VZV, or 3) the heavy chain variable region VH comprises or consists of an amino acid sequence having one or more substitutions (such as conservative substitutions), insertions or deletions relative to the amino acid sequence selected from SEQ ID NOs:19, 21, 23 or 25, and the light chain variable region VL comprises or consists of an amino acid sequence having one or more substitutions (such as conservative substitutions), insertions or deletions relative to the amino acid sequence selected from SEQ ID NOs: 20, 22, 24 or 26, and the anti-VZV antibody comprising the VH and VL has the ability to bind to VZV.

In a preferred embodiment, the present invention provides an anti-VZV antibody or antigen-binding fragment thereof, wherein the heavy chain variable region VH comprises or consists of the amino acid sequence shown in SEQ ID NO: 19; and the light chain variable region VL comprises or consists of the amino acid sequence shown in SEQ ID NO: 20.

In a preferred embodiment, the present invention provides an anti-VZV antibody or antigen-binding fragment thereof, wherein the heavy chain variable region VH comprises or consists of the amino acid sequence shown in SEQ ID NO: 21; and the light chain variable region VL comprises or consists of the amino acid sequence shown in SEQ ID NO: 22.

In a preferred embodiment, the present invention provides an anti-VZV antibody or antigen-binding fragment thereof, wherein the heavy chain variable region VH comprises or consists of the amino acid sequence shown in SEQ ID NO: 23; and the light chain variable region VL comprises or consists of the amino acid sequence shown in SEQ ID NO: 24.

In a preferred embodiment, the present invention provides an anti-VZV antibody or antigen-binding fragment thereof, wherein the heavy chain variable region VH comprises or consists of the amino acid sequence shown in SEQ ID NO: 25; and the light chain variable region VL comprises or consists of the amino acid sequence shown in SEQ ID NO: 26.

In some embodiments, the above mentioned anti-VZV antibody or antigen-binding fragment thereof further comprises a heavy chain and/or light chain constant region sequence derived from a human antibody germline consensus sequence.

In some embodiments, the antibody of the present invention also encompasses antibodies that compete with any of the antibodies described above for binding to VZV, and antibodies that bind to the same epitope of VZV as any of the antibodies described above.

In some embodiments, at least part of the framework sequence of the anti-VZV antibody is a human consensus framework sequence. In one embodiment, the anti-VZV antibody of the present invention also encompasses antibody fragments thereof, preferably antibody fragments selected from Fab, Fab'-SH, Fv, scFv and (Fab')$_2$ fragments.

In some embodiments, the anti-VZV antibody of the present invention is a neutralizing antibody for use in neutralizing VZV.

In one aspect, the invention provides a nucleic acid encoding any of the above anti-VZV antibodies or fragments thereof. In one embodiment, a vector comprising the nucleic acid is provided. In one embodiment, the vector is an expression vector. In one embodiment, a host cell comprising the vector is provided. In one embodiment, the host cell is eukaryotic. In another embodiment, the host cell is selected from mammalian cells or other cells suitable for preparing the antibody or antigen-binding fragment thereof. In another embodiment, the host cell is prokaryotic.

In one embodiment, the present invention provides a method of preparing the anti-VZV antibody or antigen-binding fragment thereof, wherein the method comprises culturing the host cell under a condition suitable for expressing the nucleic acid encoding the antibody or antigen-binding fragment thereof, and optionally isolating the antibody or antigen-binding fragment thereof. In a certain embodiment, the method further comprises recovering the anti-VZV antibody or antigen-binding fragment thereof from the host cell.

In one embodiment, the present invention provides the anti-VZV antibody or antigen-binding fragment thereof prepared by the method of the present invention.

In some embodiments, the present invention provides a composition comprising any anti-VZV antibody or antigen-binding fragment thereof described herein, preferably the composition is a pharmaceutical composition. In one embodiment, the composition further comprises a pharmaceutical carrier. In one embodiment, the anti-VZV antibody and antigen-binding fragment thereof comprised in the composition are coupled to a coupling moiety. In some embodiments, the present invention provides that the anti-VZV antibody and antigen-binding fragment thereof comprised in the composition are coupled to a coupling moiety capable of extending the half-life of the antibody or antigen-binding fragment thereof.

In another aspect, provided herein is a composition comprising any anti-VZV antibody or fragment thereof. In some embodiments, the composition further comprises a pharmaceutically acceptable carrier, excipient, or diluent. In some embodiments, the composition is a pharmaceutical composition.

In one aspect, the present invention relates to a method of neutralizing VZV contained in a subject or sample, the method comprising: (a) contacting the subject or sample with any anti-VZV antibody or fragment thereof described herein; and (b) detecting the complex formed by the anti-VZV antibody or fragment thereof and VZV. In a preferred embodiment, the anti-VZV antibody and antigen-binding fragment thereof of the present invention further include a detectable label. The present invention also relates to use of any anti-VZV antibody or fragment thereof herein in the preparation of a composition or medicine or kit for neutralizing VZV in a subject.

In another aspect, the present invention relates to a method of preventing or treating VZV infection or one or more diseases or symptoms related to VZV infection (e.g. chickenpox, herpes zoster) in a subject, the method comprising administering to the subject an effective amount of any anti-VZV antibody or fragment thereof described herein, or administering the pharmaceutical composition of the present invention. In one embodiment, the subject is a newborn baby, premature baby, woman in childbirth, and immune insufficiency subject receiving immunosuppressive agents, cytotoxic drugs or radiotherapy, etc. due to an organ transplant operation, hematological malignancy, malignant tumor, nephrotic syndrome, and the like.

The present invention also relates to the use of any anti-VZV antibody or fragment thereof described herein in the preparation of a medicament for the treatment or prevention of VZV infection or one or more diseases or symptoms related to VZV infection. In some embodiments, the condition related to VZV is chickenpox or herpes zoster.

In another aspect, the present invention relates to a method for increasing, enhancing, or stimulating an immune response or function in a subject, the method comprising administering to the subject an effective amount of any anti-VZV antibody or fragment thereof described herein, thereby increasing, enhancing, or stimulating an immune response or function in the subject.

In another aspect, any anti-VZV antibody or fragment thereof described herein for use as a medicament.

In another aspect, the present invention provides a method for diagnosing whether a subject is infected with VZV, which includes using the anti-VZV antibody and antigen-binding fragment thereof of the present invention to detect the presence and/or level of VZV in a sample from the subject. In a preferred embodiment, the anti-VZV antibody and antigen-binding fragment thereof of the present invention further include a detectable label.

In another aspect, the present invention provides a kit comprising the antibody or composition of the present invention, such as a diagnostic kit, a detection kit and a treatment kit.

The invention also encompasses any combination of any of the embodiments described herein. Any embodiment described herein or any combination thereof is applicable to any and all anti-VZV antibodies or fragments thereof, methods and uses of the invention described herein.

Beneficial Effects of the Invention

The present invention provides fully human antibodies and antigen-binding fragments thereof capable of specifically recognizing/binding to VZV. The fully human antibodies and antigen-binding fragments thereof are neutralizing antibodies that have a neutralizing effect and can inhibit VZV infection, and the antibodies and the antigen-binding fragments thereof have good affinity, strong specificity, no response to heterologous serum, and no risk of spreading other infectious diseases, and can be used in a subject to prevent and treat VZV infection or one or more diseases or symptoms related to the infection, such as chickenpox and herpes zoster.

Figure 1:
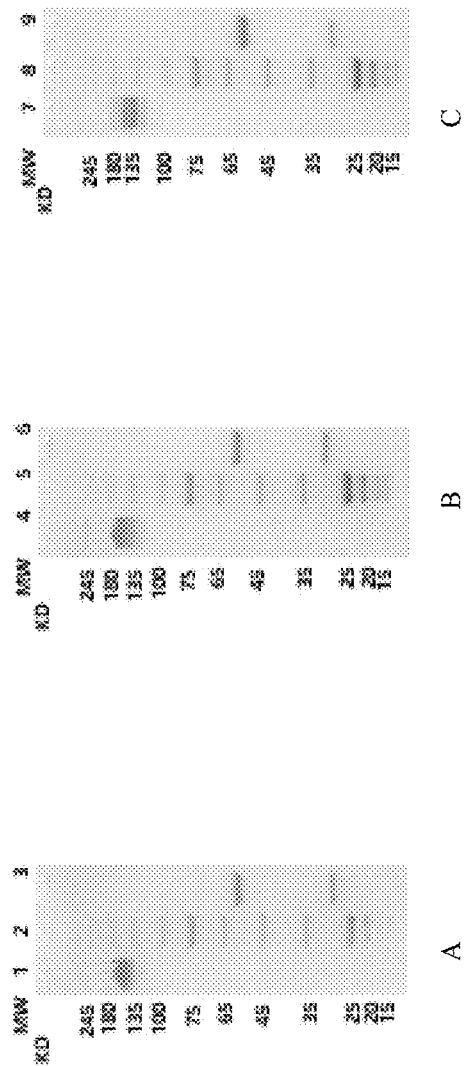
FIG. 1: SDS-PAGE examination results of purified antibodies. Lanes 1, 4, and 7 represent non-reduced fully human VZV monoclonal antibodies TRN1024, TRN1025 and TRN1026, respectively, Lanes 3, 6, and 9 represent reduced fully human VZV monoclonal antibodies TRN1024, TRN1025 and TRN1026, respectively, and Lanes 2, 5, and 8 represent Mark protein.

DETAILED DESCRIPTION OF THE INVENTION 1.1. Definition

Before describing the present invention in detail below, it should be understood that the present invention is not limited to the specific methodology, protocols, and reagents described herein, as these may vary. It should also be understood that the terms used herein is only for the purpose of describing specific embodiments, but not intended to limit the scope of the present invention, which will only be limited by the appended claims. Unless otherwise defined, all technical and scientific terms used herein have the same meaning as commonly understood by those skilled in the art to which the present invention belongs.

For the purpose of interpreting the specification, the following definitions will be used, and the terms used in the singular may also include the plural, and vice versa, if appropriate. It is understood that the term used herein is for the purpose of describing particular embodiments and is not intended to be restrictive.

The term "about" when used in connection with a numerical value is meant to encompass numerical values within the range between the lower limit of 5% less than the specified numerical value and the upper limit of 5% greater than the specified numerical value.

The term "and/or" should be understood to mean either or both of the options available.

As used herein, the term "comprising" or "including" means to include the stated elements, integers or steps, but does not exclude any other elements, integers or steps. When the term "comprising" or "including" is used herein, unless otherwise specified, it also encompasses the situation consisting of the stated elements, integers or steps. For example, when referring to an antibody variable region "comprising" a specific sequence, it is also intended to encompass an antibody variable region consisting of the specific sequence.

The term "antibody" is used in the broadest sense herein and encompasses a variety of antibody structures, including but not limited to monoclonal antibodies, polyclonal antibodies, multispecific antibodies (e.g., bispecific antibodies), and antibody fragments, as long as they show desired antigen-binding activity. An intact antibody will generally contain at least two full-length heavy chains and two full-length light chains, but may include fewer chains in some cases, for example, antibodies naturally occurring in camels may contain only heavy chains.

As used herein, "monoclonal antibody" or "mAb" refers to a single copy or cloned antibody derived, for example, from eukaryotes, prokaryotes, or phage clones, i.e., each of antibodies constituting the population is the same and/or binds to the same epitope, except for possible variant antibodies that are usually present in very small amounts (for example, a variant antibody that contains naturally occurring mutation(s) or mutation(s) produced during the production of a monoclonal antibody product). The modifier "monoclonal" refers to the characteristics of an antibody obtained from a substantially homogeneous antibody population, and should not be construed as requiring any specific method to produce the antibody. Monoclonal antibodies can be produced, for example, by hybridoma technology, recombinant technology, phage display technology, synthetic technology such as CDR grafting, or a combination of such or other techniques known in the art.

Those skilled in the art will understand that "fully antibody" (which can be used interchangeably herein with "entire antibody") includes at least two heavy chains (H) and two light chains (L). Each heavy chain is composed of a heavy chain variable region (abbreviated as VH herein) and a heavy chain constant region from N- to C-terminus. The heavy chain constant region is composed of three domains CH1, CH2 and CH3. Each light chain is composed of a light chain variable region (abbreviated as VL herein) and a light chain constant region. The light chain constant region consists of one domain, CL. The VH and VL regions can be further divided into complementarity determining regions (CDRs) and the intervening framework regions (FRs). Each of VH and VL is composed of three CDRs and 4 FRs, arranged in the following order from the amino terminus to the carboxyl terminus: FR1, CDR1, FR2, CDR2, FR3, CDR3 and FR4.

"Natural antibody" refers to naturally occurring immunoglobulin molecules with various structures. The "natural sequence of Fc domain" contains the same amino acid sequence as the amino acid sequence of the Fc domain found in nature. The natural sequence of human Fc domain includes, for example, the natural sequence of human IgG1 Fc domain (non-A and A allotypes); the natural sequence of human IgG2 Fc domain; the natural sequence of human IgG3 Fc domain; and the natural sequence of human IgG4 Fc domain; and naturally occurring variants thereof.

"Human antibody" refers to an antibody having an amino acid sequence that corresponds to the amino acid sequence of an antibody produced by human or human cells or derived from a non-human source utilizing the human antibody library or other human antibody coding sequence. Such definition for human antibody specifically excludes humanized antibodies that contain non-human antigen-binding residue(s).

The term "neutralizing antibody" refers to an antibody or antibody fragment capable of binding to a pathogen and eliminating or significantly reducing the virulence of the pathogen (for example, the ability to infect cells). Such neutralizing antibody usually plays a role in killing cells, preventing pathogens from invading cells.

In some embodiments, the invention encompasses fragments of the anti-VZV antibodies. Examples of antibody fragments include, but are not limited to, Fv, Fab, Fab', Fab'-SH, F(ab')₂, diabodies, linear antibodies, single-chain antibody molecules (such as scFv); and multispecific antibody formed by antibody fragments. Digestion of an antibody by Papain results in two identical antigen-binding fragments, called "Fab" fragments, each of which has a single antigen-binding site, and the remaining "Fc" fragment, the name reflects its ability to be readily crystallized. Pepsin treatment results in F(ab')₂ fragment, which has two antigen binding sites and is still capable of cross-linking antigens.

"Complementarity determining regions" or "CDR regions" or "CDRs" or "hypervariable regions" are amino acid regions in the antibody variable regions that is mainly responsible for binding to an epitope. The heavy chain and light chain CDRs are usually referred to as CDR1, CDR2, and CDR3, and are numbered sequentially from the N-terminus.

A variety of schemes for determining the CDR sequences of a given VH or VL amino acid sequence are well-known in the art: Kabat complementarity determining regions (CDRs) are determined on the basis of sequence variability and are the most commonly used (Kabat et al., Sequences of Proteins of Immunological Interest, 5th Edition, Public Health Service, National Institutes of Health, Bethesda, Md. (1991)), and Chothia refers to the position of the structural ring (Chothia et al., (1987) J. Mol. Biol. 196:901-917; Chothia et al. (1989) Nature 342:877-883), AbM HVR is compromised between Kabat HVR and Chothia structural ring, and is used by AbM Antibody Modeling Software of Oxford Molecular. "Contact" HVR is based on the analysis of available complex crystal structures. According to the different schemes for determining CDRs, the residues of each of these HVRs/CDRs are as follows.

| CDR | Kabat scheme | AbM scheme | Chothia scheme | Contact scheme |
|---|---|---|---|---|
| CDR1 | L24-L34 | L24-L34 | L26-L32 | L30-L36 |
| CDR2 | L50-L56 | L50-L56 | L50-L52 | L46-L55 |
| CDR3 | L89-L97 | L89-L97 | L91-L96 | L89-L96 |
| CDR1 | H31-H35B | H26-H35B | H26-H32 | H30-H35B |
| | | (Kabat numbering system) | | |
| CDR1 | H31-H35 | H26-H35 | H26-H32 | H30-H35 |
| | | (Chothia numbering system) | | |
| CDR2 | H50-H65 | H50-H58 | H53-H55 | H47-H58 |
| CDR3 | H95-H102 | H95-H102 | H96-H101 | H93-H101 |
| | | (Kabat numbering system) | | |

In one embodiment, the antibody CDRs of the present invention are CDR sequences located at the following Kabat residue positions according to the Kabat numbering system:

Positions 24-34 (CDR1), positions 50-56 (CDR2), and positions 89-97 (CDR3) in VL, and positions 27-35 (CDR1), positions 50-65 (CDR2), and positions 93-102 (CDR3) in VH.

The CDRs can also be determined based on the same Kabat numbering position as a reference CDR sequence (for example, any of the exemplary CDRs of the present invention).

The term "variant" in relation to antibodies refers herein to an antibody having amino acid alteration(s) in the target antibody region(s) (for example, a heavy chain variable region or a light chain variable region or heavy chain CDR regions or light chain CDR regions) which has (have) been subjected to at least 1, such as 1-30, or 1-20 or 1-10, such as 1 or 2 or 3 or 4 or 5 amino acid substitutions, deletions, and/or insertions, wherein the variant basically retains the biological properties of the antibody molecule prior to alteration. In one aspect, the invention encompasses variants of any of the antibodies described herein. In one embodiment, the variants of an antibody retain at least 60%, 70%, 80%, 90%, or 100% of the biological activity (e.g., antigen-binding ability) of the antibody prior to alteration. It can be understood that the antibody heavy chain variable region or light chain variable region, or each CDR region can be changed individually or collectively. In some embodiments, the amino acid alteration(s) occurring in one or more or all three heavy chain CDRs is (are) no more than 1, 2, 3, 4, 5, 6, 7, 8, 9 or 10. Preferably, the amino acid alteration(s) is (are) amino acid substitution(s), preferably conservative substitution(s).

The term "conservative substitution" refers to the substitution of an amino acid by another amino acid belonging to the same category, for example, an acidic amino acid is substituted by another acidic amino acid, a basic amino acid is substituted by another basic amino acid, or a neutral amino acid is substituted by another neutral amino acid. Exemplary substitutions are shown in the following table:

| Original residue | Exemplary substitution | Preferred conservative substitution |
|---|---|---|
| Ala (A) | Val; Leu; Ile | Val |
| Arg (R) | Lys; Gln; Asn | Lys |
| Asn (N) | Gln; His; Asp, Lys; Arg | Gln |
| Asp (D) | Glu; Asn | Glu |
| Cys (C) | Ser; Ala | Ser |
| Gln (Q) | Asn; Glu | Asn |
| Glu (E) | Asp; Gln | Asp |
| Gly (G) | Ala | Ala |
| His (H) | Asn; Gln; Lys; Arg | Arg |

-continued

| Original residue | Exemplary substitution | Preferred conservative substitution |
|---|---|---|
| Ile (I) | Leu; Val; Met; Ala; Phe; Norleucine | Leu |
| Leu (L) | Norleucine; Ile; Val; Met; Ala; Phe | Ile |
| Lys (K) | Arg; Gln; Asn | Arg |
| Met (M) | Leu; Phe; Ile | Leu |
| Phe (F) | Trp; Leu; Val; Ile; Ala; Tyr | Tyr |
| Pro (P) | Ala | Ala |
| Ser (S) | Thr | Thr |
| Thr (T) | Val; Ser | Ser |
| Trp (W) | Tyr; Phe | Tyr |
| Tyr (Y) | Trp; Phe; Thr; Ser | Phe |
| Val (V) | Ile; Leu; Met; Phe; Ala; Norleucine | Leu |

In some embodiments, the antibody variant has at least 80%, 90% or 95% or 99% or higher amino acid sequence identity to the parent antibody in the target region of the antibody.

The term "vector," as used herein, refers to a nucleic acid molecule capable of propagating another nucleic acid to which it is linked. The term includes the vector as a self-replicating nucleic acid structure as well as the vector incorporated into the genome of a host cell into which it has been introduced. Certain vectors are capable of directing the expression of nucleic acids to which they are operatively linked. Such vectors are referred to herein as "expression vectors."

The terms "host cell", "host cell line" and "host cell culture" are used interchangeably and refer to cells into which exogenous nucleic acid has been introduced, including the progeny of such cells. Host cells include "transformants" and "transformed cells", which include primary transformed cells and progeny derived therefrom, regardless of the number of passages. Progeny may not be completely identical in nucleic acid content to a parent cell, but may contain mutations. Mutant progeny that have the same function or biological activity as screened or selected for in the originally transformed cell are included herein.

Suitable host cells for cloning or expressing the nucleic acid encoding the antibody or the vector include prokaryotic or eukaryotic cells as described herein. The antibody can be produced, for example, in bacteria, especially when glycosylation and Fc effector functions are not required. For the expression of antibody fragments and polypeptides in bacteria, see, for example, U.S. Pat. Nos. 5,648,237, 5,789,199 and 5,840,523, and also see, Charlton, Methods in Molecular Biology, Volume 248 (B. K. C. Lo, ed., Humana Press, Totowa, NJ, 2003), Pages 245-254, which describes the expression of antibody fragments in *E. coli*). After expression, the antibody can be isolated from bacterial paste in soluble fraction and can be further purified.

In one embodiment, the host cell is eukaryotic. In another embodiment, the host cell is selected from yeast cells, mammalian cells, or other cells suitable for preparing antibodies or antigen-binding fragments thereof. For example, eukaryotic microorganisms such as filamentous fungi or yeasts are suitable cloning or expression hosts for the vector encoding the antibody, including fungus and yeast strains, whose glycosylation pathways have been "humanized", resulting in the production of antibodies with partially or completely human glycosylation patterns. See Gerngross, Nat. Biotech. 22: 1409-1414 (2004), and Li et al., Nat. Biotech. 24: 210-215 (2006). Host cells suitable for expressing the glycosylated antibodies are also derived from multicellular organisms (invertebrates and vertebrates). Cells from vertebrates can also be used as host. For example, a mammalian cell line that has been modified to be suitable for growth in suspension can be used. Other examples of useful mammalian host cell lines are monkey kidney CV1 line (COS-7) transformed with SV40; human embryonic kidney line (293 or 293 cells, as described in, such as, for example, Graham et al., J. Gen Virol. 36:59 (1977)) and the like. Other useful mammalian host cell lines include Chinese Hamster Ovary (CHO) cells, including DHFR-CHO cells (Urlaub et al., Proc. Natl. Acad. Sci. USA 77:216 (1980)); and myeloma cell lines such as Y0, NS0 and Sp2/0. For a review of certain mammalian host cell lines suitable for antibody production, see, for example, Yazaki and Wu, Methods in Molecular Biology, Volume 248 (B. K. C. Lo, ed., Humana Press, Totowa, NJ), pages 255-268 (2003).

An "isolated" antibody is one which has been separated from a component of its natural environment. In some embodiments, an antibody is purified to greater than 95% or 99% purity as determined by, for example, electrophoretic (e.g., SDS-PAGE, isoelectric focusing (IEF), capillary electrophoresis) or chromatography (e.g., ion exchange or reverse phase HPLC). For a review of methods for assessing the purity of an antibody, see, for example, Flatman et al., J. Chromatogr. B848:79-87 (2007).

An "isolated" nucleic acid refers to a nucleic acid molecule which has been separated from components of its natural environment. The isolated nucleic acid includes a nucleic acid molecule contained in a cell that normally contains the nucleic acid molecule, but present extra chromosomally or at a chromosomal location that is different from its natural chromosomal location.

"Percent (%) amino acid sequence identity" with respect to a reference polypeptide sequence is defined as the percentage of amino acid residues in a candidate sequence that are identical with the amino acid residues in the reference polypeptide sequence, after aligning the sequences and introducing gaps, if necessary, to achieve the maximum percent sequence identity, and not considering any conservative substitution as part of the sequence identity. Alignment for purposes of determining percent amino acid sequence identity can be achieved in various ways in the art, for instance, using publicly available computer software such as BLAST, BLAST-2, ALIGN or MEGALIGN (DNASTAR) software. Those skilled in the art can determine appropriate parameters for aligning sequences, including any algorithm needed to achieve maximal alignment over the full length of the sequences being compared.

When percentages of sequence identity are referred to in this application, these percentages are calculated relative to the full length of the longer sequence, unless otherwise specifically indicated. The calculation relative to the full length of the longer sequence applies to both the nucleic acid sequence and the polypeptide sequence.

"Affinity" or "binding affinity" refers to the inherent binding affinity that reflects the interaction between members of a binding pair (for example, an antibody and an antigen). The affinity of molecule X to its partner Y can usually be expressed by the equilibrium dissociation constant ($K_D$). The equilibrium dissociation constant is the ratio of the dissociation rate constant and the association rate constant ($k_{dis}$ and $k_{on}$, respectively). Affinity can be measured by common methods known in the art, including those known in the prior art and those described herein.

"Immunoconjugate" refers to an antibody conjugated to one or more heterologous molecules, including but not limited to a carrier.

The term "pharmaceutical composition" refers to a formulation which is in such form as to permit the biological activity of an active ingredient contained therein to be effective, and which contains no additional components which are unacceptably toxic to a subject to which the formulation would be administered.

In another aspect, the present invention provides a pharmaceutical composition comprising one or more monoclonal antibodies that bind to VZV or immunologically active fragments thereof. It should be understood that the anti-VZV antibodies or pharmaceutical compositions provided by the present invention can be integrated into a suitable carrier, excipient and other reagents in the formulation for combined administration, thereby providing improved transfer, delivery, tolerance and the like.

The term "pharmaceutically acceptable carrier" refers to a diluent, adjuvant (for example, complete or incomplete Freund's adjuvant), excipient, or vehicle that is administered with the therapeutic agent.

Pharmaceutical acceptable carriers suitable for use in the present invention may be conventional compositions and formulations suitable for drug delivery of the disclosed antibodies, for example, excipients for pharmaceutical formulation as described in "Handbook of Pharmaceutical Excipients", 7th edition, R. C. Rowe, P. J. Seskey and S. C. Owen, Pharmaceutical Press, London, Chicago; and "Remington's Pharmaceutical Sciences", E. W. Martin, Mack Publishing Co, Easton, PA, 21st edition, 2012.

In some embodiments, the nature of the carrier depends on the specific mode of administration to be used. For example, parenteral preparations usually include an injectable fluid as a carrier. The injectable fluid includes pharmaceutically and physiologically acceptable liquids, such as water, physiological saline, emulsions in oily or aqueous media, etc., and may contain agents such as suspensions, preservatives, excipients, stabilizers, surfactants, chelating agents and/or binders. In some embodiments, the pharmaceutically acceptable carrier also includes polypeptides with low molecular weight, proteins (e.g., serum albumin and gelatin), amino acids (e.g., glycine, glutamine, asparagine, glutamate, aspartic acid, methionine, arginine, and lysine), sugars and carbohydrates (e.g., polysaccharides and monosaccharides), and sugar alcohols (e.g., mannitol and sorbitol). When preparing an aqueous solution for injection, physiological saline and an isotonic solution including glucose and other adjuvants such as D-sorbitol, D-mannose, D-mannitol, and sodium chloride can be used, and if necessary, used in combination with appropriate solubilizers such as alcohols (e.g., ethanol), polyols (e.g., propylene glycol and PEG), and nonionic surfactants (e.g., polysorbate 80, polysorbate 20, poloxamer 188, and HCO-50). For solid compositions (e.g., powder, pill, tablet, or capsule forms), conventional non-toxic solid carriers can include, for example, pharmaceutical grades of mannitol, lactose, starch, or magnesium stearate. The solid composition can also be formulated as an injectable fluid in a liquid medium immediately prior to administration (for example, the lyophilized composition Herceptin™).

The pharmaceutical compositions of the present invention can be administered by various routes, including but not limited to oral, intravenous, intramuscular, intratracheal, transdermal, topical, intranasal, and other administration modes.

The term "effective amount" refers to an amount or dosage sufficient to achieve or at least partially achieve an expected effect after administered in a single or multiple doses, and "therapeutically effective amount" refers to an amount that generates the desired effect in the subject to be treated, including the improvement of the subject's symptom(s) (for example, improvement of one or more symptoms) and/or delay of the progression of symptom(s), and the like. Prophylactically effective amount refers to an amount sufficient to prevent, block, or delay the occurrence of diseases. Determining the effective amount is completely within the ability of those skilled in the art, for example, the therapeutically effective amount depends on the specific disease involved; the degree or severity of the disease; the response of the individual patient; the specific antibody to be administered; the mode of administration; the bioavailability profile of the preparation to be administered; the selected dosing regimen; and the use of any concomitant therapy, etc.

As used herein, "treatment" refers to slowing, interrupting, blocking, alleviating, stopping, reducing, or reversing the progression or severity of an existing symptom, disorder, condition, or disease.

The term "chickenpox" refers to an acute infectious disease caused by the primary infection of Varicella-Zoster Virus (VZV), which is mainly characterized by fever and systemic appearance in batches of red macules and papules, herpes, and scabs.

The term "herpes zoster" refers to a condition caused by the reactivated of latent VZV virus residing in the ganglion, in which the latent VZV virus migrates along the nerve axis to the skin innervated by the nerve and proliferates.

The term "subject" or "individual" is a primate (e.g., human and non-human primates such as monkeys). In certain embodiments, the individual or subject is a human.

1.2. The Sequence of the Exemplary Anti-VZV Antibody of the Present Invention

TABLE I

Sequence of the heavy chain variable region and light chain variable region of each antibody:

| | | |
|---|---|---|
| TRN1024 | VH | QVQLVQSGGGLVQPGGSLRLSCEASGFT FSSYWMSWVRQAPGKGLEWVANIKQDGS EKYYVDSVKGRFSISRDNAKNSLYLQMN SLRVEDTAVYYCAREGGGQGKWRLEYGM DVWGQGTTVIVSS (SEQ ID NO: 19) |
| | VL | DIVMTQSPATLSVSPGERATLSCRASQS VSSNLAWYQQKPGQAPRLLISGASTRAT GIPARFSGSGSGTEFTLTISSLQSEDFA IYYCQQYNNWPPYTFGQGTKLEIR (SEQ ID NO: 20) |
| TRN1025 | VH | QVQLVQSGGGLVQPGGSLRLSCVASGFT FSSYAMTWVRQAPGKGLEWVSTISGSGG STFYADSVRGRFTISRDNSKNALYLQMN SLRAEDTAVYYCAKDRSYGGNQPFDYWG QGTLVTVSS (SEQ ID NO: 21) |
| | VL | EIVLTQSPDSLAVSLGERATINCKSSQS VLYSSNNKNYLAWYQQKPGQPPKLLIYW ASTRQSGVPDRFSGSGSGTDFTLTVSSL QAEDVAVYYCQQYYSTPFTFGGGTKVEI K (SEQ ID NO: 22) |
| TRN1026 | VH | QVQLVQSGAEVKKPGSSVKVSCKASGRT FSSYAYSWVRQAPGQGLEWMGRVIPVLG ITNYAPKFQGKVTITVDKVTSTAFLELT GLKSDDTAVYYCARVSDDVLTGALDYWG QGTLVTVSS (SEQ ID NO: 23) |
| | VL | QSVLTQPPSVSGSPGQSVTISCTGTRSD VGSHNRVAWFQQSPGTAPKLMIYEVTNR PSGVPDRFSGSKSGNTASLTISGLQAED EADYYCSSYTSTSTWVFGGGTKLTVL (SEQ ID NO: 24) |

TABLE I-continued

Sequence of the heavy chain variable region and light chain variable region of each antibody:

| Antibody derived from TRN1026 | VH | QVQLVQSGAEVKKPGSSVKVSCKASGRT FSSYAYSWVRQAPGQGLEWMGRVIPVLG ITNYAPKFQDKVTITADKVTSTAFLELT GLKSDDTAVYYCARVSDDVLTGALDYWG QGTLVTVSS (SEQ ID NO: 25) |
|---|---|---|
| | VL | QSVLTQPPSVSGSPGQSVTISFTGTRSD VGSHNRVAWFQQSPGTAPKLMIYEVTNR PSGVPDRFSGSKSGNTASLTISGLQAED EADYYCSSYTSTSTWVFGGGTKLTVL (SEQ ID NO: 26) |

TABLE II

CDR sequence of each antibody:

| Antibody | | CDR | SEQ ID NO | sequence |
|---|---|---|---|---|
| TRN1024 | VH | CDR1 | SEQ ID NO: 1 | GFTFSSYW |
| | | CDR2 | SEQ ID NO: 2 | IKQDGSEK |
| | | CDR3 | SEQ ID NO: 3 | AREGGGQGKWRLEYGMDV |
| | VL | CDR1 | SEQ ID NO: 4 | QSVSSN |
| | | CDR2 | SEQ ID NO: 5 | GAS |
| | | CDR3 | SEQ ID NO: 6 | QQYNNWPPYT |
| TRN1025 | VH | CDR1 | SEQ ID NO: 7 | GFTFSSYA |
| | | CDR2 | SEQ ID NO: 8 | ISGSGGST |
| | | CDR3 | SEQ ID NO: 9 | AKDRSYGGNQPFDY |
| | VL | CDR1 | SEQ ID NO: 10 | QSVLYSSNNKNY |
| | | CDR2 | SEQ ID NO: 11 | WAS |
| | | CDR3 | SEQ ID NO: 12 | QQYYSTPFT |
| TRN1026 | VH | CDR1 | SEQ ID NO: 13 | GRTFSSYA |
| | | CDR2 | SEQ ID NO: 14 | VIPVLGIT |
| | | CDR3 | SEQ ID NO: 15 | ARVSDDVLTGALDY |
| | VL | CDR1 | SEQ ID NO: 16 | RSDVGSHNR |
| | | CDR2 | SEQ ID NO: 17 | EVT |
| | | CDR3 | SEQ ID NO: 18 | SSYTSTSTWV |

EXAMPLES

The present invention is further illustrated according to the following examples. However, it should be understood that the examples are described in an illustrative rather than a limiting manner, and various modifications can be made by those skilled in the art.

The present invention will be implemented by conventional methods of chemistry, biochemistry, organic chemistry, molecular biology, microbiology, recombinant DNA technology, genetics, immunology and cell biology in the art, unless clearly indicated to the contrary. The descriptions of these methods can be found in, for example, Sambrook et al., Molecular Cloning: A Laboratory Manual (3rd edition, 2001); Sambrook et al., Molecular Cloning: A Laboratory Manual (2nd edition, 1989); Maniatis et al., Molecular Cloning: A Laboratory Manual (1982); Ausubel et al., Current Protocols in Molecular Biology (John Wiley and Sons, updated in July 2008); Short Protocols in Molecular Biology: A Compendium of Methods from Current Protocols in Molecular Biology, Greene Pub. Associates and Wiley-Interscience; Glover, DNA Cloning: A Practical Approach, vol. I&II (IRL Press, Oxford, 1985); Anand, Techniques for the Analysis of Complex Genomes, (Academic Press, New York, 1992); Transcription and Translation (B. Hames & S. Higgins, Eds., 1984); Perbal, A Practical Guide to Molecular Cloning (1984); Harlow and Lane, Antibodies, (Cold Spring Harbor Laboratory Press, Cold Spring Harbor, NY, 1998) Current Protocols in Immunology Q. E. Coligan, A. M. Kruisbeek, D. H. Margulies, E. M. Shevach and W. Strober, eds., 1991); Annual Review of Immunology; and journals such as Advances in Immunology.

Example 1

Sorting of the Plasma Cells

Volunteers were vaccinated with varicella vaccine (Merck, Zostavax) according to the manufacturer's protocol, blood samples were collected on day 7 after vaccination, the plasma and PBMC cells were separated by density centrifugation, respectively. The specific method was referred to the granted invention patent CN107760690B. The VZV gH/gL protein complex (CAMBRIDGEBIO, Cat No: 01-11-0045) was selected as an antigen for ELISA to detect the serum antibody titer, and the sample with the highest antibody titer and significant fold change (50-fold dilution, OD value>2.0) was selected for Flow Sorting. Single plasma cells were sorted through flow cytometry with a gate of CD3/ CD14/ CD16/ cd235a− CD19+ CD20+/− CD38hi CD27hi, and a population of specific plasma cells were separated, from which the genetic sequences of fully human monoclonal antibody against VZV were isolated. The specific method was referred to the granted invention patent CN107760690B.

Example 2

Isolation of the Variable Region Gene of the Target Antibody

First, cDNA (a first strand) was synthesized from the plasma cells obtained in Example 1 by reverse transcription with primers for constant region (see the primer information disclosed in CN107760690B) and Superscript III Reverse Transcriptase (Invitrogen, Carlsbad, CA). The antibody gene was then isolated according to the following PCR procedure: For the first round of PCR: 5 ul of reverse transcription reaction product, 5 units of Taq enzyme, 0.2 mM dNTPs, and 0.5 uM of primers for each of antibody subtypes heavy and light chain constant region (sequence) were contained in a 50 ul system, reaction conditions: 95° C., 5 min for pre-denaturation, then 35 PCR cycles, for each cycle: 95° C.×30 s, 55° C.×60 s, 72° C.×90 s, and finally 72° C., 7 min for extension. For the second round of PCR: 2.5 ul of the first round PCR reaction product, 5 units of Taq Plus enzyme, 0.2 mM dNTPs, and 0.5 uM of primers for each of antibody subtypes heavy and light chain variable region were contained in a 50 ul system, reaction conditions: 95° C., 5 min for pre-denaturation, then 35 PCR cycles, for each cycle: 95° C.×30 s, 58° C.×60 s, 72° C.×90 s, and finally 72° C., 7 min for extension. The resulting PCR products were identified by 1.2% agarose gel electrophoresis.

The PCR products of antibody genes that were identified as positive and where the heavy and light chains can be matched to a pair were purified with Qiagen PCR Product Purification Kit, sequenced from the forward and reverse directions respectively, and analyzed with IMGT online server (http://imgt.cines.fr/).

Example 3

Construction of Recombinant Antibody for Expression

The resulting PCR products of the antibody variable region genes were ligated into the pcDNA3.3 vector containing the human IgG1 constant region by using TA cloning method to construct the expression vector for the fully human neutralizing antibody against Varicella-Zoster Virus, and then the expression vector was transformed into DH5α competent bacterium for amplification of the vector and the recombinant plasmid was extracted. HEK293 cells were co-transfected with the resulting recombinant plasmid and the transfection reagent PolyFect and cultured in an incubator at 37° C., 8% $CO_2$. The expression vector for the paired heavy and light chain gene was expressed in the cells. After 96 hours of culture, the supernatant was collected. The cell debris was discarded by centrifugation, and the supernatant was purified by Protein A affinity chromatography. The purified antibodies were tested by SDS-PAGE. As shown in FIG. 1, the results indicated that the non-reduced bands of antibodies TRN1024, TRN1025, and TRN1026 were between 135-180KD. The heavy and light chain bands were clearly observed after reduction, that is, the target antibodies—recombinant fully human neutralizing antibodies against Varicella-Zoster Virus were obtained.

Example 4

Detection of Binding Activity of the Recombinant Antibodies

In this experiment, the recombinant antibodies obtained from the above examples were tested by ELISA assay to determine the binding activity.

Figure 2:
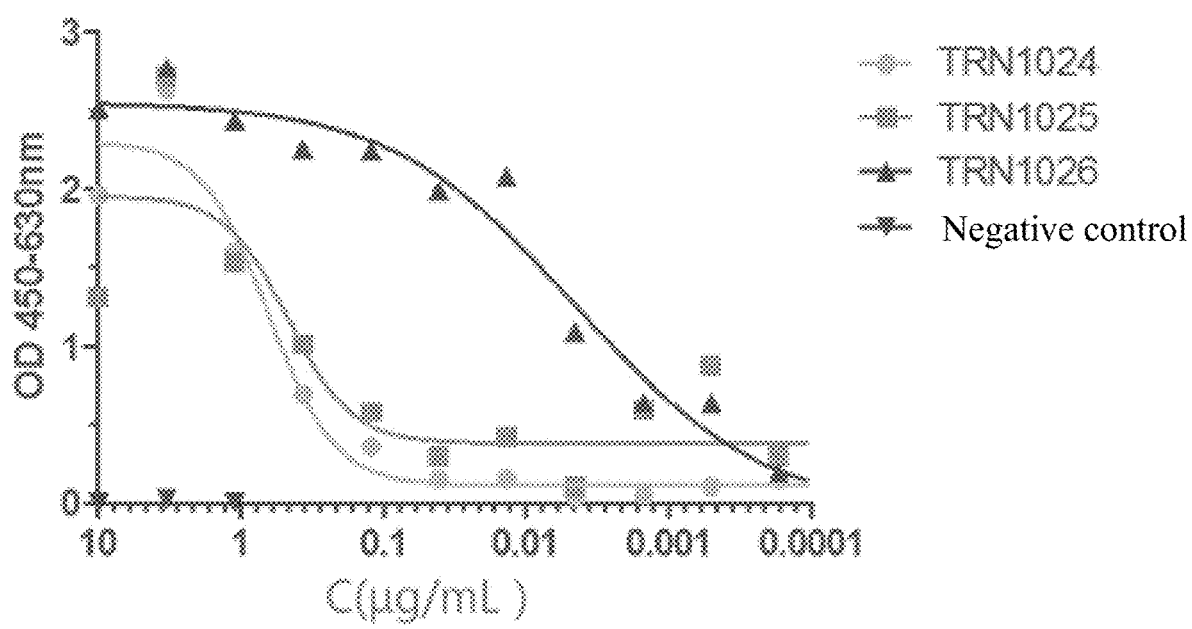
FIG. 2: ELISA assay results of three fully human VZV monoclonal antibody strains TRN1024, TRN1025 and TRN1026.

The 96-well ELISA plate was coated with 100 ng/well VZV gH/gL protein complex at 4° C. overnight, and then blocked with a blocking solution at room temperature for 2 hours. Then, 100 uL of HEK293 cell culture supernatant containing the recombinant antibody of the present invention and a negative control (anti-rabies virus antibody TRN006, an antibody irrelevant to VZV) were added to the 96-well plate, and incubated at 37° C. for 1 h. 100 μL of Goat-Anti-IgG-Fab-HRP diluted 1:10000 with blocking solution was added to each well, and incubated at 37° C. for 1 h. After the reaction was terminated, the OD values were detected and the results were calculated. Finally, three fully human VZV monoclonal antibodies TRN1024, TRN1025, and TRN1026 capable of binding to VZV gH/gL protein were screened out, with EC50 as low as 0.002 ug/mL (shown in FIG. 2), indicating that the antibodies obtained in the present invention are capable of specifically binding to VZV gH/gL protein.

Example 5

Detection of Affinity of the Recombinant Antibodies

Figure 3:
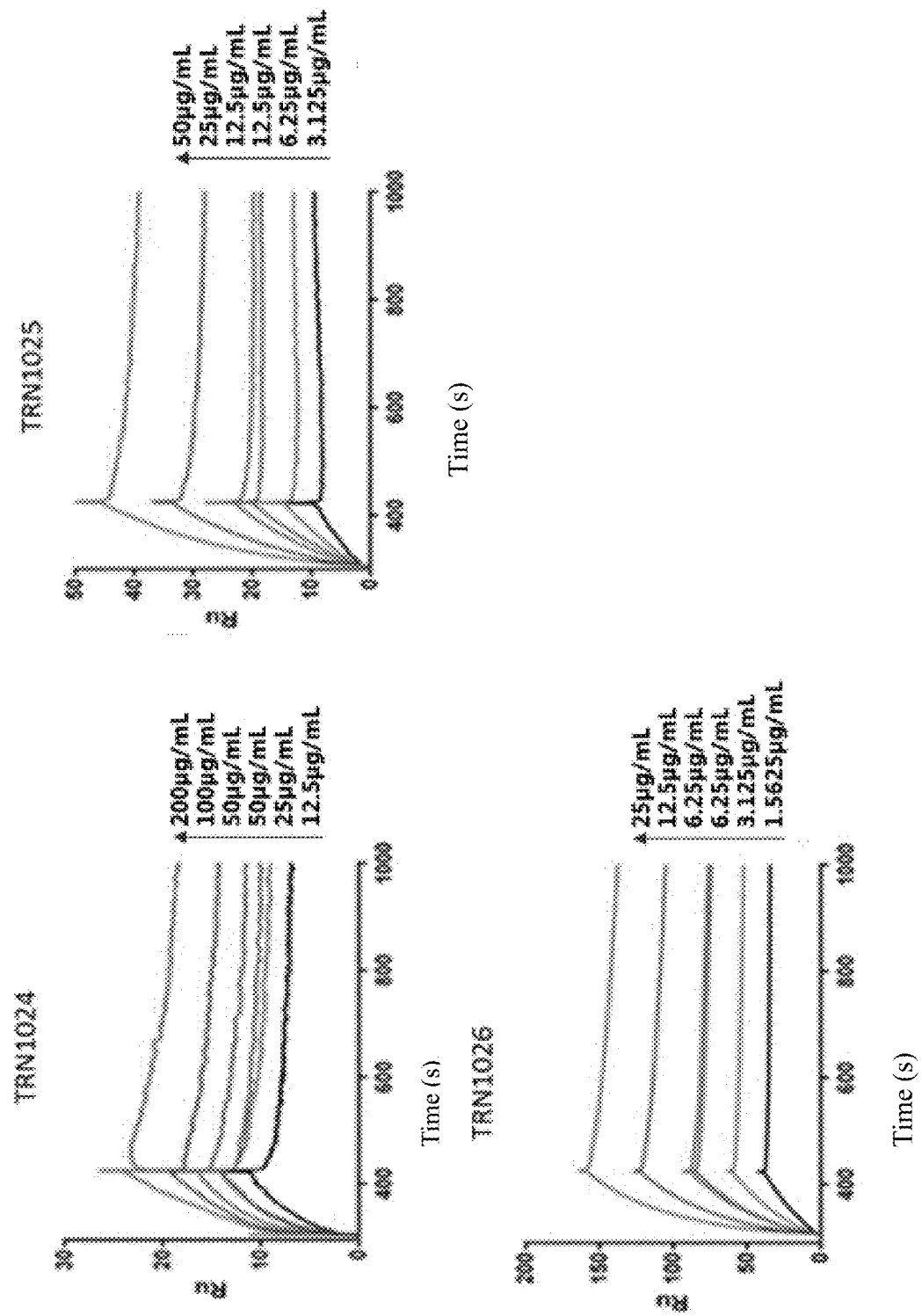
FIG. 3: Fitted association and dissociation sensing diagrams of three fully human VZV monoclonal antibody strains TRN1024, TRN1025 and TRN1026.

The antibodies of the present invention were measured with surface plasmon resonance technique (Instrument, BIACORE3000) for the determination of the KD values. Capture molecules were coupled to CM5 chip to activate the dextran surface of the chip, and the coupling amount was determined according to the injection time. The prepared antibodies were used as ligands, and the calculated signal values were used to determine the injection concentration and contact time of the monoclonal antibodies. The VZV gH/gL protein complex (CAMBRIDGEBIO, Cat No: 01-11-0045), to be used as an analyte, was diluted with HBS-EP buffer, and then the analytes with increasing concentrations were allowed to flow through the chip, thereby resulting in signal curves respectively. Each concentration was considered as 1 cycle. After 1 cycle was completed, the chip was regenerated with 10 mmol/L glycine-hydrochloric acid to restore the original state where no antigen had been bound. BiaCore X-100 System software was used for analysis. The specific procedures were as follows:

Anti-human IgG (Fc) was coupled to each of the two channels of the CM5 chip by means of amino coupling. For the captured TRN1024, TRN1025 and TRN1026, the concentration was 1 μg/mL, and the binding time was 60 s. As shown in FIG. 3, the minimum and maximum concentration of the bound VZV gH/gL protein complex was 1.56 μg/mL and 200 μg/mL, respectively, the binding time was 90 s, and the dissociation time was 600 s. The regeneration solution was 3M $MgCl_2$ and the regeneration time was 30 s.

The association rate (ka), dissociation rate (kd), and equilibrium dissociation constant were calculated by simultaneously fitting the association and dissociation sensorgrams (FIG. 3). The results are shown in the following table. All of the three strains of antibodies TRN1024, TRN1025 and TRN1026 have higher affinity, that is, the antibodies of the present invention can efficiently bind to the antigen.

| Ligand | Analyte | ka (1/Ms) | kd (1/s) | KD (M) |
| --- | --- | --- | --- | --- |
| TRN1026 | gHgL-Cambridge | 1.03E+05 | 2.74E−04 | 2.66E−09 |
| TRN1025 | gHgL-Cambridge | 3.11E+04 | 4.16E−04 | 1.34E−08 |
| TRN1024 | gHgL-Cambridge | 1.69E+04 | 6.21E−04 | 3.67E−08 |

Example 6

Identification of the In Vitro Neutralizing Activity of the Recombinant Antibodies Human embryonic lung fibroblasts (MRC-5) were used to determine the neutralizing activity of the antibodies. According to conventional methods, the cells were detected by Enzyme-Linked Immunospot assay after being infected with VZV virus. The number of positive cells with signals was the number of infected cells, which can be considered as the units of VZV virus used in the infection experiment. The titer of VZV virus was determined by the method of gradient dilution spot counting. The infected MRC-5 cells as described above were digested by conventional methods, and then plated onto a 96-well plate for conventional culture, for use in the next day's neutralization experiment. On the day of the experiment, each of the antibodies TRN1024, TRN1025, and TRN1026 was 2-fold diluted with PBS solution starting from 100 ug/mL, with a total of 10 gradient dilutions, and each of the antibody gradient dilutions in PBS solution was added to a new 96-well plate at a concentration of 50 uL/well. Then, 50 uL VZV Oka standard strain, at 100 CCID50 (50% cell culture infectious dose), was added to each well, neutralization was allowed at 37° C. for one hour, and then the neutralizing solution was added to the 96-well plate containing MRC-5 cells cultured on the previous day. 100 uL of virus culture medium was supplemented to each well and the pathologic condition of the cells were observed daily.

The results showed that the antibodies of the present invention could obviously neutralize the activity of the VZV Oka standard strain and could inhibit the apoptosis of MRC-5 cells; whereas the control without the addition of the antibody could not neutralize the activity of the virus. After calculation, the neutralizing titers of the three antibodies TRN1024, TRN1025 and TRN1026 reached 1.56 ug/mL, showing that the three antibodies can specifically recognize the cells infected with the VZV virus, and play a role in neutralizing the virus and inhibiting the spread of the virus among cells.

Example 7

Detection of the Anti-Nuclear Resistance of the Recombinant Antibodies

Figure 4:
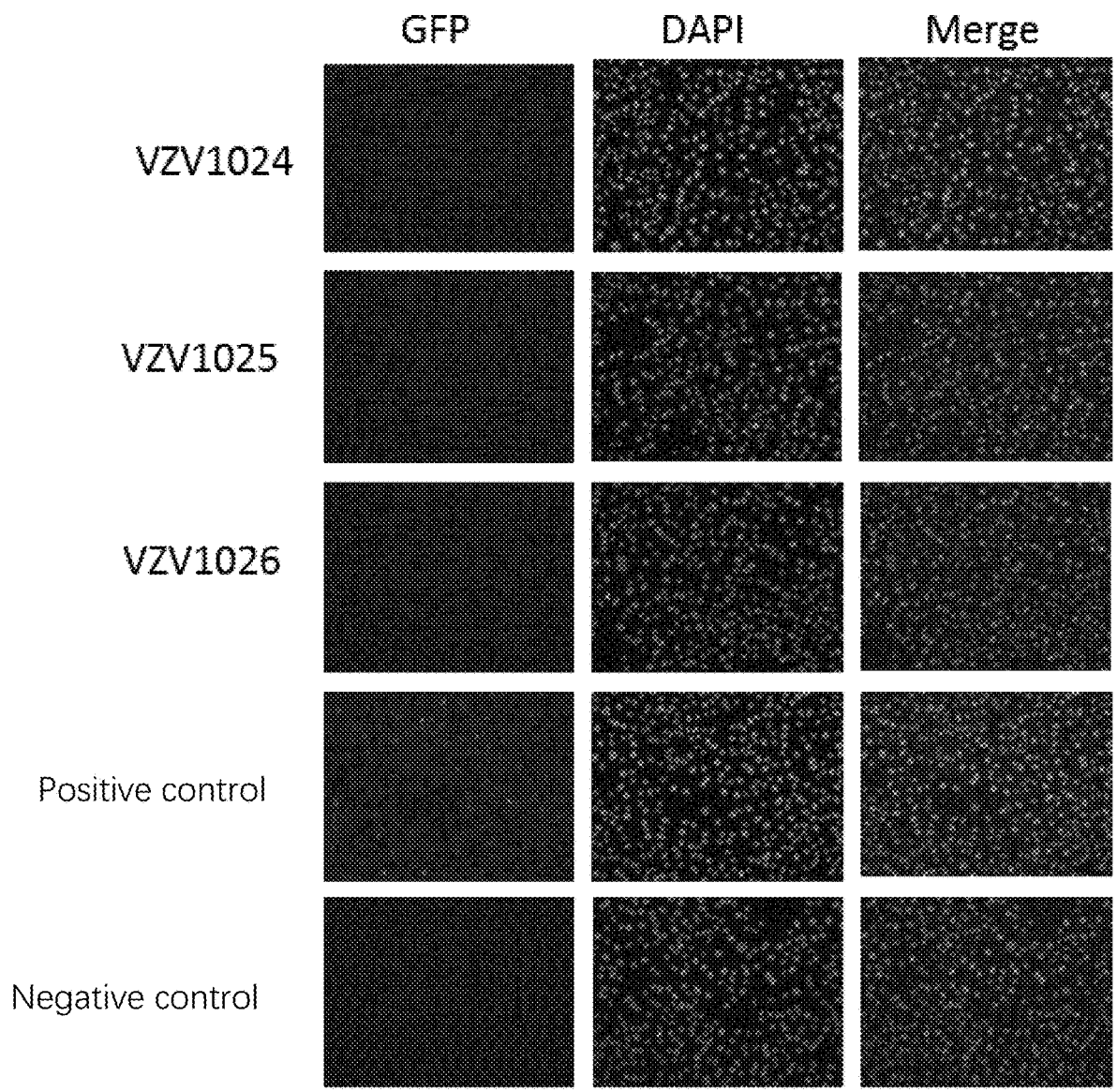
FIG. 4: Anti-nuclear resistance test results of three fully human VZV monoclonal antibody TRN1024, TRN1025 and TRN1026.

Hep-2 cells are human laryngeal cancer epithelial cells. An internationally standard method for the detection of anti-nuclear antibodies is indirect immunofluorescence, with Hep-2 cells as substrates, because of their abundant antigen spectrum (about 100-150 types), strong antigen specificity and high antigen content. In this example, the staining response of the antibodies to the Hep2 cells was detected by the immunofluorescence method to determine whether the antibodies have autoimmune response. Anti-nuclear antibody (ANA) detection kit (for 200 persons) was used for detection and observation was performed under fluorescence microscope. The results were shown in FIG. 4. None of the experimental groups of antibodies TRN1024, TRN1025 and TRN1026 (100 ug/ml) and the negative control group showed fluorescence (GFP) specific for Hep-2 cells, that is, the antibodies do not bind to antigens of Hep-2 cells; whereas obvious GFP fluorescence was observed in the positive control group. This indicates that the antibodies of the present invention have no autoimmune response to Hep-2 cells.

Example 8

In Vitro Test of Neutralizing Viruses Derived from Clinical Samples

Fluids were collected from herpes of patients with varicella or herpes zoster virus and viruses were isolated from the clinical samples (The method for isolation was referred to Liu J, Wang M, Gan L et al. Genotyping of Clinical Varicella-Zoster Virus Isolates Collected in China[J]. Journal of Clinical Microbiology, 2009, 47(5):1418-1423./Liu J J, Wang M L, Gan L et al. [Seroepidemiology of varicella-zoster virus infection measured by the fluorescent antibody to membrane antigen test][J]. Zhonghua liu zing bing xue za zhi=Zhonghua liuxingbingxue zazhi, 2009, 30(4):371.), 10 VZV clinical isolates were isolated. These clinical isolates of VZV were subjected to virus culture to prepare cell-free virus (CFV). The in vitro neutralizing ability of the three strains of antibodies TRN1024, TRN1025, and TRN1026 was determined by conventional plaque reduction neutralization test (gold standard), wherein VariZIG (Cangene, Immunoglobulin) was used as the positive control, and the irrelevant antibody TRN006 was used as the negative control. The results showed that all of the three antibodies TRN1024, TRN1025, and TRN1026 could specifically recognize and neutralize these 10 innVZV clinical isolates, suggesting clinical significance.

Example 9

In Vivo Test of the Prevention

In this example, the in vivo preventive function of the three antibody strains of TRN1024, TRN1025 and TRN1026 against VZV Oka strain virus infection was explored. 4 week-old, 300-350 g guinea pigs were selected and assigned to the blank group, control group (VariZIG) and experimental group (TRN1026, 5 mg/kg). First, equal amounts of saline, VariZIG and TRN1026 were administered, and 1 days later, each animal was injected intravenously 50 uL $1 \times 10^6$ PBMCs infected with VZV Oka virus strain (available from ATCC). The blood viral load was determined on days 1, 3 and 7 by drawing blood (the gene copy number of the virus was detected). The results of viral gene copy numbers showed that the experimental group and the control group showed significantly lower viral load compared to the blank group, indicating that the low-dose of the antibody can protect guinea pigs against VZV virus attack, that is, the recombinant anti-VZV antibody of the present invention has in vivo activity and protective effect.

Example 10

Analysis of the Identity of the Variable Region Sequence of the Recombinant Antibodies The applicant has discovered that, for the antibody sequences discovered in the present invention, one or more amino acid sequence modifications of substitutions (such as conservative substitutions), insertions or deletions which have been introduced into the framework regions of the heavy chain variable region and/or light chain variable region, will not substantially affect the binding ability of the variable region to the antigen. For the antibody TRN1026 of this application, the heavy chain variable region sequence (VH) is as shown in SEQ ID NO: 23, and the light chain variable region sequence (VL) is as shown in SEQ ID NO: 24. As an example, antibody derivatives resulting from incorporating one or more amino acid sequence modifications of substitutions (such as conservative substitutions), insertions or deletions in the framework regions of the variable region of the antibody TRN1026, still remain the binding activity of the anti-VZV antibody. For example, the antibody variant derived from antibody TRN1026, which has VH as shown in SEQ ID NO: 25 and VL as shown in SEQ ID NO: 26, was expressed and the culture supernatant was taken therefrom to determine its binding activity by EILISA. The results showed that the antibody variant derived from antibody TRN1026 still remained the binding activity to the VZV gH/gL protein complex, with an EC50 as low as 0.05 ug/mL. It can be seen that one or more amino acid modifications of substitutions (such as conservative substitutions), insertions or deletions in the framework regions of the antibody variable regions will not affect the ability and function of the recombinant antibodies.

What is claimed is:

1. An isolated anti-VZV monoclonal antibody or antigen-binding fragment thereof, comprising three complementarity determining region CDRs of the heavy chain variable region and three complementarity determining region CDRs of the light chain variable region, wherein
   (i) CDR1 of the heavy chain variable region comprises the amino acid sequence as shown in SEQ ID NO: 7, CDR2 of the heavy chain variable region comprises the amino acid sequence as shown in SEQ ID NO: 8, CDR3 of the heavy chain variable region comprises the amino acid sequence as shown in SEQ ID NO: 9, and CDR1 of the light chain variable region comprises the amino acid sequence as shown in SEQ ID NO: 10, CDR2 of the light chain variable region comprises the amino acid sequence as shown in SEQ ID NO: 11, and CDR3 of the light chain variable region comprises the amino acid sequence as shown in SEQ ID NO: 12;
   (ii) CDR1 of the heavy chain variable region comprises the amino acid sequence as shown in SEQ ID NO: 1, CDR2 of the heavy chain variable region comprises the amino acid sequence as shown in SEQ ID NO: 2, CDR3 of the heavy chain variable region comprises the amino acid sequence as shown in SEQ ID NO: 3, and CDR1 of the light chain variable region comprises the amino acid sequence as shown in SEQ ID NO: 4, CDR2 of the light chain variable region comprises the amino acid sequence as shown in SEQ ID NO: 5, and CDR3 of the light chain variable region comprises the amino acid sequence as shown in SEQ ID NO: 6; or
   (iii) CDR1 of the heavy chain variable region comprises the amino acid sequence as shown in SEQ ID NO: 13, CDR2 of the heavy chain variable region comprises the amino acid sequence as shown in SEQ ID NO: 14, CDR3 of the heavy chain variable region comprises the amino acid sequence as shown in SEQ ID NO: 15, and CDR1 of the light chain variable region comprises the amino acid sequence as shown in SEQ ID NO: 16, CDR2 of the light chain variable region comprises the amino acid sequence as shown in SEQ ID NO: 17, and CDR3 of the light chain variable region comprises the amino acid sequence as shown in SEQ ID NO: 18.

2. The isolated anti-VZV monoclonal antibody or antigen-binding fragment thereof according to claim 1, comprising a heavy chain variable region and a light chain variable region, wherein
   (i) the heavy chain variable region comprises an amino acid sequence having at least 90% identity to SEQ ID NO: 21 or an amino acid sequence as shown in SEQ ID NO: 21, and the light chain variable region comprises an amino acid sequence having at least 90% identity to SEQ ID NO: 22 or an amino acid sequence as shown in SEQ ID NO: 22; or
   (ii) the heavy chain variable region comprises an amino acid sequence having at least 90% identity to SEQ ID NO: 19 or an amino acid sequence as shown in SEQ ID NO: 19, and the light chain variable region comprises an amino acid sequence having at least 90% identity to SEQ ID NO: 20 or an amino acid sequence as shown in SEQ ID NO: 20; or
   (iii) the heavy chain variable region comprises an amino acid sequence having at least 90% identity to SEQ ID NO: 23 or an amino acid sequence as shown in SEQ ID NO: 23, and the light chain variable region comprises an amino acid sequence having at least 90% identity to SEQ ID NO: 24 or an amino acid sequence as shown in SEQ ID NO: 24; or
   (iv) the heavy chain variable region comprises an amino acid sequence having at least 90% identity to SEQ ID NO: 25 or an amino acid sequence as shown in SEQ ID NO: 25, and the light chain variable region comprises an amino acid sequence having at least 90% identity to SEQ ID NO: 26 or an amino acid sequence as shown in SEQ ID NO: 26.

3. The isolated anti-VZV monoclonal antibody or antigen-binding fragment thereof according to claim 1, wherein the antibody is a human monoclonal antibody.

4. The isolated anti-VZV monoclonal antibody or antigen-binding fragment thereof according to claim 1, wherein the antigen-binding fragment is selected from the group consisting of Fab, Fab'-SH, Fv, scFv and (Fab')$_2$ fragment.

5. The isolated anti-VZV monoclonal antibody or antigen-binding fragment thereof according to claim 1, comprising a heavy chain and a light chain constant region sequences, wherein the heavy chain and light chain constant region sequences are human IgG1 heavy chain and light chain constant region sequences.

6. An isolated nucleic acid encoding the isolated anti-VZV monoclonal antibody or antigen-binding fragment thereof according to claim 1.

7. A vector comprising the nucleic acid of claim 6.

8. A host cell comprising the vector of claim 7, wherein the host cell is a prokaryotic cell or a eukaryotic cell.

9. A method of preparing an anti-VZV monoclonal antibody or antigen-binding fragment thereof, comprising culturing the host cell of claim 8 under a condition suitable for expressing the anti-VZV monoclonal antibody or antigen-binding fragment thereof according to claim 1.

10. A pharmaceutical composition comprising the anti-VZV monoclonal antibody or antigen-binding fragment thereof according to claim 1 and a pharmaceutical carrier.

11. A method of treating a human individual infected with Varicella-Zoster Virus or having Varicella-Zoster Viral disease, comprising administering to the individual in need of the treatment an effective amount of the pharmaceutical composition of claim 10.

12. A method of enhancing the resistance of a human individual to Varicella-Zoster Virus infection, comprising administering to the individual in need thereof an effective amount of the pharmaceutical composition of claim 10.

13. The method of claim 11, wherein the individual is immunocompromised.

14. The method of claim 11, wherein the individual is a newborn baby, premature baby, woman in childbirth, and immune insufficiency subject receiving immunosuppressive agents, cytotoxic drugs or radiotherapy due to an organ transplant operation, hematological malignancy, malignant tumor, or nephrotic syndrome.

15. A method of neutralizing Varicella-Zoster Virus in a subject or sample, comprising adding an appropriate amount of the anti-VZV monoclonal antibody or antigen-binding fragment thereof according to claim 1 to the subject or sample.

16. The method of claim 12, wherein the individual is immunocompromised.

17. The method of claim 12, wherein the individual is a newborn baby, premature baby, woman in childbirth, and immune insufficiency subject receiving immunosuppressive agents, cytotoxic drugs or radiotherapy due to an organ transplant operation, hematological malignancy, malignant tumor, or nephrotic syndrome.

18. The host cell according to claim 8, wherein the host cell is selected from yeast cells, or mammalian cells.

19. The isolated anti-VZV monoclonal antibody or antigen-binding fragment thereof according to claim 2, comprising a heavy chain and a light chain constant region sequences, wherein the heavy chain and light chain constant region sequences are human IgG1 heavy chain and light chain constant region sequences.

\* \* \* \* \*

SEQUENCE LISTING

<160> NUMBER OF SEQ ID NOS: 26

<210> SEQ ID NO 1
<211> LENGTH: 8

```
<212> TYPE: PRT
<213> ORGANISM: Artificial Sequence
<220> FEATURE:
<223> OTHER INFORMATION: amino acid sequence

<400> SEQUENCE: 1

Gly Phe Thr Phe Ser Ser Tyr Trp
1               5

<210> SEQ ID NO 2
<211> LENGTH: 8
<212> TYPE: PRT
<213> ORGANISM: Artificial Sequence
<220> FEATURE:
<223> OTHER INFORMATION: amino acid sequence

<400> SEQUENCE: 2

Ile Lys Gln Asp Gly Ser Glu Lys
1               5

<210> SEQ ID NO 3
<211> LENGTH: 18
<212> TYPE: PRT
<213> ORGANISM: Artificial Sequence
<220> FEATURE:
<223> OTHER INFORMATION: amino acid sequence

<400> SEQUENCE: 3

Ala Arg Glu Gly Gly Gly Gln Gly Lys Trp Arg Leu Glu Tyr Gly Met
1               5                   10                  15

Asp Val

<210> SEQ ID NO 4
<211> LENGTH: 6
<212> TYPE: PRT
<213> ORGANISM: Artificial Sequence
<220> FEATURE:
<223> OTHER INFORMATION: amino acid sequence

<400> SEQUENCE: 4

Gln Ser Val Ser Ser Asn
1               5

<210> SEQ ID NO 5

<400> SEQUENCE: 5

000

<210> SEQ ID NO 6
<211> LENGTH: 10
<212> TYPE: PRT
<213> ORGANISM: Artificial Sequence
<220> FEATURE:
<223> OTHER INFORMATION: amino acid sequence

<400> SEQUENCE: 6

Gln Gln Tyr Asn Asn Trp Pro Pro Tyr Thr
1               5                   10

<210> SEQ ID NO 7
<211> LENGTH: 8
<212> TYPE: PRT
<213> ORGANISM: Artificial Sequence
<220> FEATURE:
<223> OTHER INFORMATION: amino acid sequence
```

```
<400> SEQUENCE: 7

Gly Phe Thr Phe Ser Ser Tyr Ala
1               5

<210> SEQ ID NO 8
<211> LENGTH: 8
<212> TYPE: PRT
<213> ORGANISM: Artificial Sequence
<220> FEATURE:
<223> OTHER INFORMATION: amino acid sequence

<400> SEQUENCE: 8

Ile Ser Gly Ser Gly Gly Ser Thr
1               5

<210> SEQ ID NO 9
<211> LENGTH: 14
<212> TYPE: PRT
<213> ORGANISM: Artificial Sequence
<220> FEATURE:
<223> OTHER INFORMATION: amino acid sequence

<400> SEQUENCE: 9

Ala Lys Asp Arg Ser Tyr Gly Gly Asn Gln Pro Phe Asp Tyr
1               5                   10

<210> SEQ ID NO 10
<211> LENGTH: 12
<212> TYPE: PRT
<213> ORGANISM: Artificial Sequence
<220> FEATURE:
<223> OTHER INFORMATION: amino acid sequence

<400> SEQUENCE: 10

Gln Ser Val Leu Tyr Ser Ser Asn Asn Lys Asn Tyr
1               5                   10

<210> SEQ ID NO 11

<400> SEQUENCE: 11

000

<210> SEQ ID NO 12
<211> LENGTH: 9
<212> TYPE: PRT
<213> ORGANISM: Artificial Sequence
<220> FEATURE:
<223> OTHER INFORMATION: amino acid sequence

<400> SEQUENCE: 12

Gln Gln Tyr Tyr Ser Thr Pro Phe Thr
1               5

<210> SEQ ID NO 13
<211> LENGTH: 8
<212> TYPE: PRT
<213> ORGANISM: Artificial Sequence
<220> FEATURE:
<223> OTHER INFORMATION: amino acid sequence

<400> SEQUENCE: 13

Gly Arg Thr Phe Ser Ser Tyr Ala
1               5

<210> SEQ ID NO 14
```

```
<211> LENGTH: 8
<212> TYPE: PRT
<213> ORGANISM: Artificial Sequence
<220> FEATURE:
<223> OTHER INFORMATION: amino acid sequence

<400> SEQUENCE: 14

Val Ile Pro Val Leu Gly Ile Thr
1               5

<210> SEQ ID NO 15
<211> LENGTH: 14
<212> TYPE: PRT
<213> ORGANISM: Artificial Sequence
<220> FEATURE:
<223> OTHER INFORMATION: amino acid sequence

<400> SEQUENCE: 15

Ala Arg Val Ser Asp Asp Val Leu Thr Gly Ala Leu Asp Tyr
1               5                   10

<210> SEQ ID NO 16
<211> LENGTH: 9
<212> TYPE: PRT
<213> ORGANISM: Artificial Sequence
<220> FEATURE:
<223> OTHER INFORMATION: amino acid sequence

<400> SEQUENCE: 16

Arg Ser Asp Val Gly Ser His Asn Arg
1               5

<210> SEQ ID NO 17

<400> SEQUENCE: 17

000

<210> SEQ ID NO 18
<211> LENGTH: 10
<212> TYPE: PRT
<213> ORGANISM: Artificial Sequence
<220> FEATURE:
<223> OTHER INFORMATION: amino acid sequence

<400> SEQUENCE: 18

Ser Ser Tyr Thr Ser Thr Ser Thr Trp Val
1               5                   10

<210> SEQ ID NO 19
<211> LENGTH: 125
<212> TYPE: PRT
<213> ORGANISM: Artificial Sequence
<220> FEATURE:
<223> OTHER INFORMATION: amino acid sequence

<400> SEQUENCE: 19

Gln Val Gln Leu Val Gln Ser Gly Gly Gly Leu Val Gln Pro Gly Gly
1               5                   10                  15

Ser Leu Arg Leu Ser Cys Glu Ala Ser Gly Phe Thr Phe Ser Ser Tyr
            20                  25                  30

Trp Met Ser Trp Val Arg Gln Ala Pro Gly Lys Gly Leu Glu Trp Val
        35                  40                  45

Ala Asn Ile Lys Gln Asp Gly Ser Glu Lys Tyr Tyr Val Asp Ser Val
    50                  55                  60
```

-continued

Lys Gly Arg Phe Ser Ile Ser Arg Asp Asn Ala Lys Asn Ser Leu Tyr
 65                  70                  75                  80

Leu Gln Met Asn Ser Leu Arg Val Glu Asp Thr Ala Val Tyr Tyr Cys
                 85                  90                  95

Ala Arg Glu Gly Gly Gly Gln Gly Lys Trp Arg Leu Glu Tyr Gly Met
            100                 105                 110

Asp Val Trp Gly Gln Gly Thr Thr Val Ile Val Ser Ser
        115                 120                 125

<210> SEQ ID NO 20
<211> LENGTH: 108
<212> TYPE: PRT
<213> ORGANISM: Artificial Sequence
<220> FEATURE:
<223> OTHER INFORMATION: amino acid sequence

<400> SEQUENCE: 20

Asp Ile Val Met Thr Gln Ser Pro Ala Thr Leu Ser Val Ser Pro Gly
 1               5                  10                  15

Glu Arg Ala Thr Leu Ser Cys Arg Ala Ser Gln Ser Val Ser Ser Asn
             20                  25                  30

Leu Ala Trp Tyr Gln Gln Lys Pro Gly Gln Ala Pro Arg Leu Leu Ile
         35                  40                  45

Ser Gly Ala Ser Thr Arg Ala Thr Gly Ile Pro Ala Arg Phe Ser Gly
 50                  55                  60

Ser Gly Ser Gly Thr Glu Phe Thr Leu Thr Ile Ser Ser Leu Gln Ser
 65                  70                  75                  80

Glu Asp Phe Ala Ile Tyr Tyr Cys Gln Gln Tyr Asn Asn Trp Pro Pro
             85                  90                  95

Tyr Thr Phe Gly Gln Gly Thr Lys Leu Glu Ile Arg
            100                 105

<210> SEQ ID NO 21
<211> LENGTH: 121
<212> TYPE: PRT
<213> ORGANISM: Artificial Sequence
<220> FEATURE:
<223> OTHER INFORMATION: amino acid sequence

<400> SEQUENCE: 21

Gln Val Gln Leu Val Gln Ser Gly Gly Gly Leu Val Gln Pro Gly Gly
 1               5                  10                  15

Ser Leu Arg Leu Ser Cys Val Ala Ser Gly Phe Thr Phe Ser Ser Tyr
             20                  25                  30

Ala Met Thr Trp Val Arg Gln Ala Pro Gly Lys Gly Leu Glu Trp Val
         35                  40                  45

Ser Thr Ile Ser Gly Ser Gly Ser Thr Phe Tyr Ala Asp Ser Val
 50                  55                  60

Arg Gly Arg Phe Thr Ile Ser Arg Asp Asn Ser Lys Asn Ala Leu Tyr
 65                  70                  75                  80

Leu Gln Met Asn Ser Leu Arg Ala Glu Asp Thr Ala Val Tyr Tyr Cys
                 85                  90                  95

Ala Lys Asp Arg Ser Tyr Gly Asn Gln Pro Phe Asp Tyr Trp Gly
            100                 105                 110

Gln Gly Thr Leu Val Thr Val Ser Ser
        115                 120

<210> SEQ ID NO 22

```
<211> LENGTH: 113
<212> TYPE: PRT
<213> ORGANISM: Artificial Sequence
<220> FEATURE:
<223> OTHER INFORMATION: amino acid sequence

<400> SEQUENCE: 22

Glu Ile Val Leu Thr Gln Ser Pro Asp Ser Leu Ala Val Ser Leu Gly
1               5                   10                  15

Glu Arg Ala Thr Ile Asn Cys Lys Ser Ser Gln Ser Val Leu Tyr Ser
            20                  25                  30

Ser Asn Asn Lys Asn Tyr Leu Ala Trp Tyr Gln Gln Lys Pro Gly Gln
        35                  40                  45

Pro Pro Lys Leu Leu Ile Tyr Trp Ala Ser Thr Arg Gln Ser Gly Val
50                  55                  60

Pro Asp Arg Phe Ser Gly Ser Gly Ser Gly Thr Asp Phe Thr Leu Thr
65                  70                  75                  80

Val Ser Ser Leu Gln Ala Glu Asp Val Ala Val Tyr Tyr Cys Gln Gln
                85                  90                  95

Tyr Tyr Ser Thr Pro Phe Thr Phe Gly Gly Gly Thr Lys Val Glu Ile
            100                 105                 110

Lys

<210> SEQ ID NO 23
<211> LENGTH: 121
<212> TYPE: PRT
<213> ORGANISM: Artificial Sequence
<220> FEATURE:
<223> OTHER INFORMATION: amino acid sequence

<400> SEQUENCE: 23

Gln Val Gln Leu Val Gln Ser Gly Ala Glu Val Lys Lys Pro Gly Ser
1               5                   10                  15

Ser Val Lys Val Ser Cys Lys Ala Ser Gly Arg Thr Phe Ser Ser Tyr
            20                  25                  30

Ala Tyr Ser Trp Val Arg Gln Ala Pro Gly Gln Gly Leu Glu Trp Met
        35                  40                  45

Gly Arg Val Ile Pro Val Leu Gly Ile Thr Asn Tyr Ala Pro Lys Phe
50                  55                  60

Gln Gly Lys Val Thr Ile Thr Val Asp Lys Val Thr Ser Thr Ala Phe
65                  70                  75                  80

Leu Glu Leu Thr Gly Leu Lys Ser Asp Asp Thr Ala Val Tyr Tyr Cys
                85                  90                  95

Ala Arg Val Ser Asp Asp Val Leu Thr Gly Ala Leu Asp Tyr Trp Gly
            100                 105                 110

Gln Gly Thr Leu Val Thr Val Ser Ser
        115                 120

<210> SEQ ID NO 24
<211> LENGTH: 110
<212> TYPE: PRT
<213> ORGANISM: Artificial Sequence
<220> FEATURE:
<223> OTHER INFORMATION: amino acid sequence

<400> SEQUENCE: 24

Gln Ser Val Leu Thr Gln Pro Pro Ser Val Ser Gly Ser Pro Gly Gln
1               5                   10                  15

Ser Val Thr Ile Ser Cys Thr Gly Thr Arg Ser Asp Val Gly Ser His
```

20                  25                  30

Asn Arg Val Ala Trp Phe Gln Gln Ser Pro Gly Thr Ala Pro Lys Leu
                35                  40                  45

Met Ile Tyr Glu Val Thr Asn Arg Pro Ser Gly Val Pro Asp Arg Phe
 50                  55                  60

Ser Gly Ser Lys Ser Gly Asn Thr Ala Ser Leu Thr Ile Ser Gly Leu
 65                  70                  75                  80

Gln Ala Glu Asp Glu Ala Asp Tyr Tyr Cys Ser Ser Tyr Thr Ser Thr
                85                  90                  95

Ser Thr Trp Val Phe Gly Gly Gly Thr Lys Leu Thr Val Leu
            100                 105                 110

<210> SEQ ID NO 25
<211> LENGTH: 121
<212> TYPE: PRT
<213> ORGANISM: Artificial Sequence
<220> FEATURE:
<223> OTHER INFORMATION: amino acid sequence

<400> SEQUENCE: 25

Gln Val Gln Leu Val Gln Ser Gly Ala Glu Val Lys Lys Pro Gly Ser
1               5                   10                  15

Ser Val Lys Val Ser Cys Lys Ala Ser Gly Arg Thr Phe Ser Ser Tyr
                20                  25                  30

Ala Tyr Ser Trp Val Arg Gln Ala Pro Gly Gln Gly Leu Glu Trp Met
            35                  40                  45

Gly Arg Val Ile Pro Val Leu Gly Ile Thr Asn Tyr Ala Pro Lys Phe
 50                  55                  60

Gln Asp Lys Val Thr Ile Thr Ala Asp Lys Val Thr Ser Thr Ala Phe
 65                  70                  75                  80

Leu Glu Leu Thr Gly Leu Lys Ser Asp Asp Thr Ala Val Tyr Tyr Cys
                85                  90                  95

Ala Arg Val Ser Asp Asp Val Leu Thr Gly Ala Leu Asp Tyr Trp Gly
            100                 105                 110

Gln Gly Thr Leu Val Thr Val Ser Ser
            115                 120

<210> SEQ ID NO 26
<211> LENGTH: 110
<212> TYPE: PRT
<213> ORGANISM: Artificial Sequence
<220> FEATURE:
<223> OTHER INFORMATION: amino acid sequence

<400> SEQUENCE: 26

Gln Ser Val Leu Thr Gln Pro Pro Ser Val Ser Gly Ser Pro Gly Gln
1               5                   10                  15

Ser Val Thr Ile Ser Phe Thr Gly Thr Arg Ser Asp Val Gly Ser His
                20                  25                  30

Asn Arg Val Ala Trp Phe Gln Gln Ser Pro Gly Thr Ala Pro Lys Leu
            35                  40                  45

Met Ile Tyr Glu Val Thr Asn Arg Pro Ser Gly Val Pro Asp Arg Phe
 50                  55                  60

-continued

```
Ser Gly Ser Lys Ser Gly Asn Thr Ala Ser Leu Thr Ile Ser Gly Leu
 65              70                  75                  80

Gln Ala Glu Asp Glu Ala Asp Tyr Tyr Cys Ser Ser Tyr Thr Ser Thr
                85                  90                  95

Ser Thr Trp Val Phe Gly Gly Gly Thr Lys Leu Thr Val Leu
            100                 105                 110
```